(12) United States Patent
Kwon et al.

(10) Patent No.: US 7,733,851 B2
(45) Date of Patent: Jun. 8, 2010

(54) NAME SERVICE SYSTEM AND METHOD THEREOF

(75) Inventors: Sung-Bok Kwon, Seoul (KR); Dae-Won Kim, Seoul (KR); Sang-Hoon Lee, Seoul (KR)

(73) Assignee: IDIS Co., Ltd. (KR)

( * ) Notice: Subject to any disclaimer, the term of this patent is extended or adjusted under 35 U.S.C. 154(b) by 578 days.

(21) Appl. No.: 11/415,647

(22) Filed: May 2, 2006

(65) Prior Publication Data

US 2006/0251057 A1 Nov. 9, 2006

(30) Foreign Application Priority Data

May 6, 2005 (KR) .................. 10-2005-0038123

(51) Int. Cl.
*H04L 12/66* (2006.01)
(52) U.S. Cl. ............... 370/352; 379/93.21; 379/100.12; 379/219
(58) Field of Classification Search ............... 379/93.3, 379/93.21, 100.12, 219; 370/352; 709/203, 709/217, 223, 224
See application file for complete search history.

(56) References Cited

U.S. PATENT DOCUMENTS

| 6,411,966 | B1 | 6/2002 | Kwan et al. | |
|---|---|---|---|---|
| 6,973,507 | B2* | 12/2005 | Yoon et al. | 709/245 |
| 7,158,026 | B2* | 1/2007 | Feldkamp et al. | 340/531 |
| 7,337,217 | B2* | 2/2008 | Wang | 709/217 |
| 2002/0040397 | A1* | 4/2002 | Choi | 709/226 |

(Continued)

FOREIGN PATENT DOCUMENTS

EP 1385316 A1 5/2003

(Continued)

OTHER PUBLICATIONS

European Office Action; Nov. 23, 2007; EP06252340. All references cited in the foreign Office action and not previously submitted are listed above.

(Continued)

*Primary Examiner*—Curtis Kuntz
*Assistant Examiner*—Yosef K Laekemariam
(74) *Attorney, Agent, or Firm*—Cantor Colburn LLP

(57) ABSTRACT

Provided are a name service system and a method thereof. The name service system includes: a name service server registering a name and corresponding network information received through a communication network when name registration is requested, and sending network information corresponding to the registered name when a name call is requested; a plurality of monitoring devices collecting information, having respective names, requesting the name registration to the name service server through the communication network, registering the name and the network information corresponding to the name in the name service server, and sending changed network information to the name service server when the registered network information changes; and a plurality of remote control management devices connecting to the name service server through the communication network to request the name call, receiving network information corresponding to the name and sent from the name service server, connecting through the communication network using the network information, and thus receiving collected information. Accordingly, it is possible to communicate in a communication network environment using a dynamic Internet protocol (IP) address with only the name of a communication connection target and no additional information, so that a system making connection easy and effective can be constructed.

16 Claims, 6 Drawing Sheets

U.S. PATENT DOCUMENTS

| | | | |
|---|---|---|---|
| 2002/0152311 A1* | 10/2002 | Veltman et al. | 709/227 |
| 2004/0064334 A1 | 4/2004 | Nye | |
| 2004/0098507 A1* | 5/2004 | Thubert et al. | 709/245 |
| 2004/0139228 A1 | 7/2004 | Takeda et al. | |
| 2004/0264439 A1 | 12/2004 | Doherty et al. | |
| 2006/0227761 A1* | 10/2006 | Scott et al. | 370/352 |

FOREIGN PATENT DOCUMENTS

| | | | |
|---|---|---|---|
| EP | 1501252 A3 | | 4/2005 |
| JP | 2001-148707 | | 5/2001 |
| JP | 2003-140986 | | 6/2003 |
| JP | 2003-188901 | | 7/2003 |
| JP | 2003-273896 | | 9/2003 |
| JP | 2003-249943 | | 11/2004 |
| JP | 2004-312695 | | 11/2004 |
| JP | 2004-312714 | | 11/2004 |
| JP | 2005-051473 | | 2/2005 |
| KR | EP 1385316 | * | 7/2002 |
| WO | 03/030482 | | 4/2003 |

OTHER PUBLICATIONS

Japanese Office Action dated Jun. 17, 2008 corresponding to Japanese Patent Application No. 2006-128686.

Linux Today; Embedded Web Servers for VCRs, The Fridge Etc; Jun. 26, 1999; XP002252454.

Vixie P. et al: "Dynamic Updates in the Domain Name System (DNS Update); rfc2136.txt"; IETF Standard, Internet Engineering Task Force, IETF, CH Apr. 1997; XP015007920.

Anonymous: "nsupdate"; Nsupdate Manual Page, Jun. 30, 2000; pp. 1-4; XP002388173.

Smdarshi Pali: "Setting u web services using Dynamic Domain Name Server (DDNS)"; Jul. 28, 2001; XP002238057.

Zeichick A: "TZO Premiere Dynamic DNS Service"; Dec. 12, 1999; XP002179790.

Patent Abstracts of Japan; vol. 2000, No. 13, Feb. 5, 2001; & JP 2000 76453 A (NEC Corp), Oct. 6, 2000.

European Search Report; Application No. 06252340.2-2413; Date: Aug. 1, 2006.

All the references cited in the Search Report are listed above.

* cited by examiner

FIG. 3

| ID | NAME | IP ADDRESS | PORT NUMBER | NAT | Description |
|---|---|---|---|---|---|
| 0001 | DVR1 | w.x.y.z | aa | Y | |
| 0002 | DVR2 | x.y.z.w | bb | Y | |
| 0003 | REMOTE MANAGEMENT SYSTEM1 | y.z.x.w | cc | N | |
| 0004 | REMOTE MANAGEMENT SYSTEM2 | z.x.y.w | dd | N | |
| | | | | | |

NAME SERVICE SYSTEM AND METHOD THEREOF

CROSS-REFERENCE TO RELATED APPLICATION

This application claims the benefit of Korean Patent Application No. 10-2005-0038123, filed on May 6, 2005, the disclosure of which is hereby incorporated herein by reference in its entirety.

BACKGROUND

1. Field of the Invention

The present invention relates to a name service server, and more specifically, to a name service system and method rendering it possible to communicate in a communication environment using dynamic Internet protocol (IP) addresses with only the name of a communication target required for connection between a monitoring device and a remote control management system or between clients.

2. Discussion of Related Art

For connection between a conventional digital video recorder (DVR) and a remote control management system, or between client computers, a communication network such as a local area network (LAN), a public switched telephone network (PSTN), etc., and an IP address or a port number are required.

FIG. 1 is a block diagram illustrating connection of conventional DVRs and remote control management systems.

As shown in FIG. 1, a conventional system comprises a plurality of DVRs 10-1 to 10-n, a communication network connected to the DVRs, and a plurality of remote control management systems 40-1 to 40-m connected to the communication network.

In FIG. 1, the plurality of DVRs 10-1 to 10-n are installed at a remote site to monitor, collect, and store images of the site. When an event occurs, the DVRs send it through the communication network 30 to the remote control management systems 40-1 to 40-m.

The communication network 30 may be at least one of a communication network using a static IP address or a dynamic IP address such as a LAN, a wide area network (WAN), a PSTN, a public switched data network (PSDN), an asymmetric digital subscriber line (ADSL), or an integrated services digital network (ISDN), and connects the plurality of DVRs 10-1 to 10-n with the remote control management systems 40-1 to 40-m.

The remote control management systems 40-1 to 40-m perform various control functions such as connecting the DVRs 10-1 to 10-n through the communication network 30, viewing or searching for images, and detecting events.

Referring to FIG. 1, in order for the remote control management systems 40-1 to 40-m to connect to the DVRs 10-1 to 10-n at a remote site, the DVRs 10-1 to 10-n and the remote control management systems 40-1 to 40-m should use a communication network enabling themselves to connect to each other, and the remote control management systems 40-1 to 40-m should have network information such as an IP address and port number of the DVRs 10-1 to 10-n to be connected.

This is the same for the case where the DVRs 10-1 to 10-n connect to the remote control management systems 40-1 to 40-m.

In FIG. 1, when the DVRs 10-1 to 10-n use static or public IP addresses, the IP address and port information do not change, and thus it is easy to connect thereto. However, when the DVRs 10-1 to 10-n are connected to a dynamic IP environment in which the IP address is variable, like an ADSL environment or a dynamic host configuration protocol (DHCP), the remote control management systems 40-1 to 40-m wanting connection should know the changed IP address every time the IP address has changed in order to connect the DVRs 10-1 to 10-n, and thus it is considerably difficult to make the connection.

In addition, when a client computer connected to an external communication network connects to a communication device that supports the network address translation (NAT) function, such as an IP sharer or a router, and attempts to connect to another client computer belonging to a private network, network information required for the connection cannot be obtained and thus connection is impossible.

Recently, a dynamic domain name system (DDNS) allowing a dynamic IP address to be used as a static IP address assigned to a leased line has been used. A DDNS server is informed of the IP address assigned to each computer from a specific program installed in the computer, and stores the IP address and a domain name as a pair. When a user requests connection, the DDNS server provides the IP address corresponding to the domain name so that the user need not directly cope with change of the IP address.

However, the DDNS is limited for Internet service such as the world wide web or e-mail utilized mainly by computer terminals and supports the port forwarding function, but the DDNS server does not store port information and only supports the port forwarding function for ports (well-known ports) related to Internet service provided in connection with specific programs installed in the user's computer, and router should be registered to DNS. Therefore, DDNS has the drawback that a side wanting connection has to know the port number of the communication target in a general application such as a DVR control application which is not an Internet service.

In addition, when a plurality of computers are connected to an IP sharer or router having the NAT function to form a private network, and connection is desired between a computer connected to an external communication network and a computer in the private network through a DDNS server, the side wanting connection should know the port number of the other computer.

SUMMARY OF THE INVENTION

It is an object of the present invention to provide a name service system enabling a user to connect to a DVR or remote control management system with only the name of the connection target, in a communication network environment using a static IP address, a dynamic IP address, or a NAT function.

It is another object of the present invention to provide a name service system allowing a client computer connected to a private network or using a dynamic IP address to connect to another client computer with only the name of the other client computer.

It is yet another object of the present invention to provide the method for name service enabling a DVR, a remote control management system, or a client computer to register self information with a name service server, in order to receive required information from the name service server using the name of a connection target and connect to the target using the information.

A first form of name service system according to the present invention comprises a name service server, a plurality of monitoring devices, and a plurality of remote control management devices. The name service server registers a name and network information corresponding to a name received through a communication network when name registration is requested, and sends network information corresponding to the registered name when a name call is requested. The monitoring devices collect information, have respective names, request name registration to the name service server through the communication network and register the name and corresponding network information in the name service server, and send changed network information to the name service server when the registered network information changes. The remote control management devices connect to the name service server through the communication network to request the name call, receive the network information corresponding to the name and sent from the name service server, connect to a monitoring device through the communication network using the received network information, and thus receive collected information.

The monitoring devices may be a camera obtaining image data for monitoring a remote site, a microphone obtaining voice data, and a DVR connected with a plurality of devices comprising a variety of detection sensors and receiving and storing monitoring data from the devices.

When a predetermined event occurs, the monitoring devices may request the name call to the name service server through the communication network, receive network information corresponding to the name sent from the name service server, and connect to a remote control management device through the communication network using the received network information.

The remote control management devices may have respective names, request name registration to the name service server through the communication network, register the name and corresponding network information in the name service server, and send changed network information to the name service server when the registered network information changes.

The network information may be an IP address and port information required for connection.

The monitoring devices may be connected to a private network using a dynamic IP address and port number, or a private IP address and port number.

The remote control management devices may be connected to a private network using a dynamic IP address and port number, or a private IP address and port number.

A second form of a name service system according to the present invention comprises a name service server, a plurality of first-type clients, and a plurality of second-type clients. The name service server registers a name and corresponding network information received through a communication network when name registration is requested, and sends network information corresponding to the registered name when a name call is requested. Both the first-type clients and the second-type clients have respective names, request name registration to the name service server through the communication network and register the name and corresponding network information in the name service server, send changed network information to the name service server when the registered network information changes, and request the name call to the name service server to receive network information corresponding to the name from the name service server. And, when any one of the first-type clients and any one of the second-type clients attempt to connect with one another, they do so using the name service server.

The network information may be an IP address and port information required for connection.

The first-type clients may be connected to a private network using a dynamic IP address and port number, or a private IP address and port number, and connect to the second-type clients through the communication network.

The second-type clients may be connected to a private network using a dynamic IP address and port number, or a private IP address and port number, and connect to the first-type clients through the communication network.

The method for name service according to the present invention comprises the steps of: registering of monitoring devices or remote control management devices in a name server through a communication network; requesting of the monitoring devices or remote control management devices, a name call to the name service server through the communication network; sending, at the name service server, network information corresponding to the name call through the communication network; and connecting of the monitoring devices or remote control management devices through the communication network using the network information.

The network information may be an IP address and port information required for connection.

The step of registering in the name server may include the steps of: inputting, at the monitoring devices or remote control management devices, a name to be registered in the name service server; examining, at the name service server, whether the name is valid; inputting or extracting, at the monitoring devices or remote control management devices, additional information to register it in the name service server; judging, at the name service server, whether the monitoring devices or remote control management devices use a network address translation (NAT) function, and registering an IP address; and standing by, at the monitoring devices and remote control management devices, for a predetermined time and then examining whether there is changed information.

In the step of the name service server examining whether the name is valid, the name service server may assign a peculiar key value to each of the monitoring devices and remote control management devices to be registered and thus prevent registration of a duplicate name.

In the step of the monitoring devices or remote control management devices inputting or extracting additional information to register it in the name service server, the monitoring devices and remote control management devices may input an IP address and port information required for bidirectional communication.

In the step of the name service server judging whether the monitoring devices or remote control management devices use the NAT function and registering an IP address, the name service server may register an IP address of a communication device supporting the NAT function when the monitoring devices or remote control management devices use the NAT function, and may register a received IP address when the monitoring devices or remote control management devices do not use the NAT function.

In the step of the monitoring devices and remote control management devices standing by for a predetermined time and examining whether there is changed information, the monitoring devices and remote control management devices may examine whether there is changed information at every predetermined time intervals and in case of change, send any changed information to the name service server.

The step of the monitoring devices or remote control management devices requesting a name call to the name service server through the communication network may include the steps of: inputting, at the monitoring devices or remote control management devices, an address of the name service server; inputting, at the monitoring devices or remote control management devices, a name of a monitoring device or remote control management device targeted for connection; and judging, at the name service server, whether the called name is registered.

BRIEF DESCRIPTION OF THE DRAWINGS

The above and other features and advantages of the present invention will become more apparent to those of ordinary skill in the art by describing in detail exemplary embodiments thereof with reference to the attached drawings in which:

FIG. 3 is a table showing an example of a database managed by a name service server of a name service system according to the present invention;

DETAILED DESCRIPTION OF EXEMPLARY EMBODIMENTS

Hereinafter, a name service system and method thereof according to exemplary embodiments of the present invention will be described with reference to the accompanying drawings.

Figure 1:
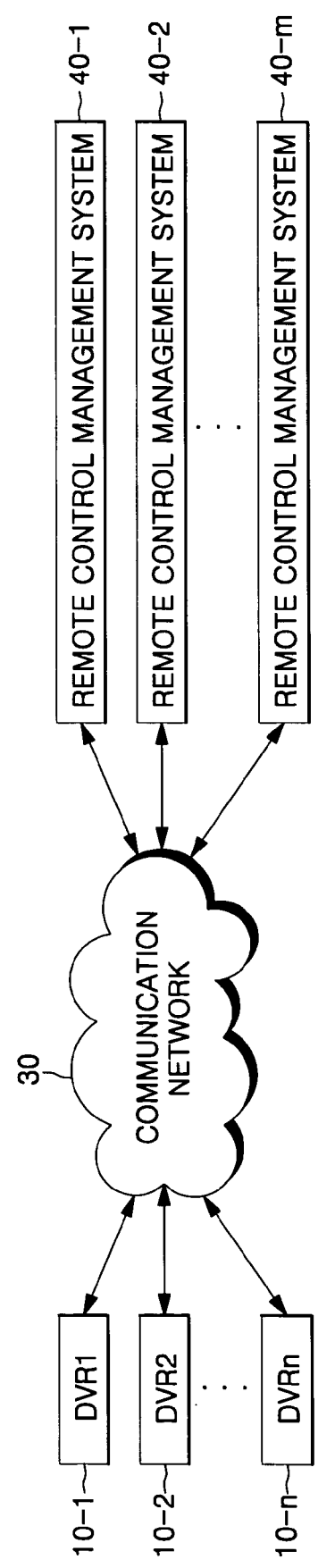
FIG. 1 is a block diagram illustrating conventional connection between a digital video recorder (DVR) and a remote control management system.
Figure 2:
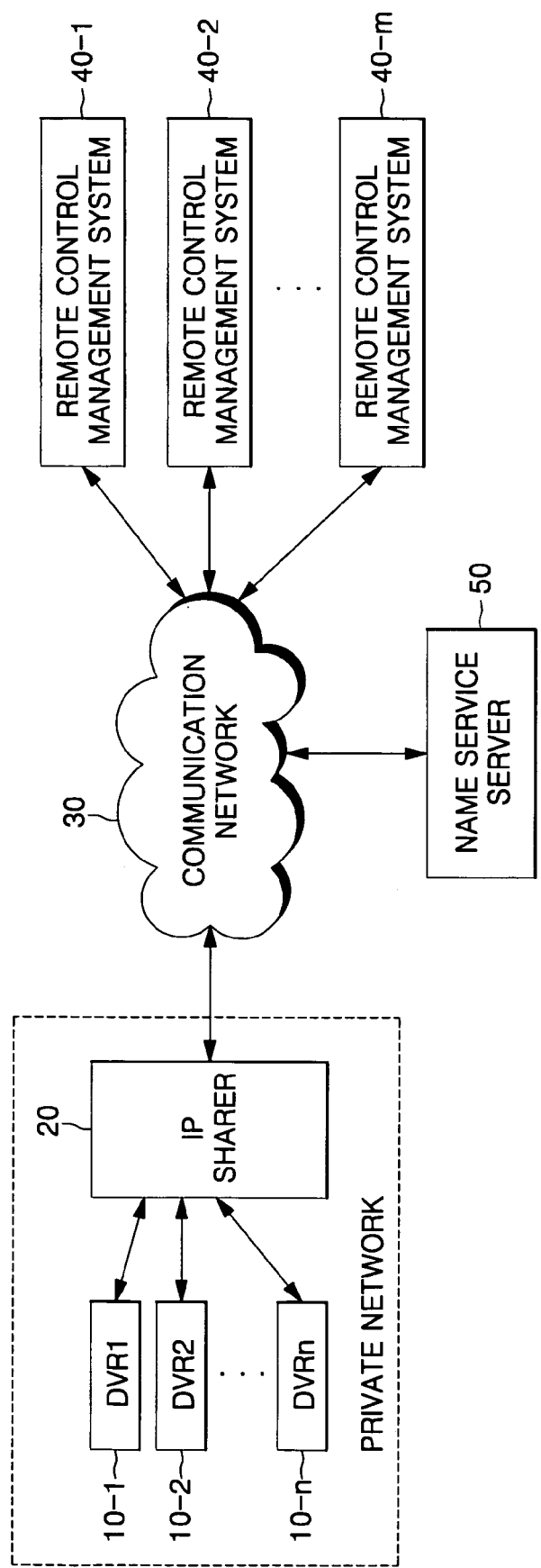
FIG. 2 is a block diagram of a name service system according to an exemplary embodiment of the present invention.

FIG. 2 is a block diagram of a name service system according to an exemplary embodiment of the present invention. The name service system comprises at least one DVR, e.g., DVRs 10-1 to 10-n, installed at remote sites, an IP sharer 20 that connects the DVRs to form a private network, a communication network 30 connected to the IP sharer, a plurality of remote control management systems 40-1 to 40-m connected with the communication network, and a name service server 50 connected between the DVRs 10-1 to 10-n and the remote control management systems 40-1 to 40-m through the communication network 30.

Though not shown in FIG. 2, the DVRs 10-1 to 10-n are connected with a camera to obtain image data for monitoring a remote site, a microphone to obtain voice data, and a plurality of devices comprising a variety of detection sensors, and receive and store data obtained from monitoring.

In FIG. 2, the DVRs 10-1 to 10-n of the private network each use a private IP address and a private port number, have a name, are installed at a remote site to collect and store monitored images, and inform a corresponding one of the remote control management systems 40-1 to 40-m when a predetermined event occurs.

In more detail, the DVRs 10-1 to 10-n register their name, network information, and product information in the name service server 50 by request. Then, when an event occurs, in order to notify a corresponding remote control management system, the DVRs 10-1 to 10-n ask the name service server 50 for network information of the destination of the transmission. Then, the DVRs 10-1 to 10-n receive the network information sent by the name service server 50 and connect to the corresponding remote control management system through the communication network 30.

In addition, the DVRs 10-1 to 10-n examine whether network information has changed or not at every predetermined time intervals, and when it has changed, send the changed information to the name service server 50.

The network information is information, such as an IP address and port number, required to connect through the communication network 30.

FIG. 2 illustrates the DVRs 10-1 to 10-n belonging to the private network only. However, DVRs using a public IP address or public port information may be connected to the communication network 30 and the function and operation of the name service system remain the same as described above.

The IP sharer 20 connects the DVRs 10-1 to 10-n to form the private network and supports the NAT function. Thus, the IP sharer 20 converts a private IP address and port number of a DVR into a public IP address and port number and sends the public IP address and port number to the DVRs 10-1 to 10-n when the DVRs 10-1 to 10-n transmit information through the communication network 30, and converts a public IP address and port number into a private IP address and port number and sends the private IP address and port number to the DVRs 10-1 to 10-n when the DVRs 10-1 to 10-n receive information through the communication network 30.

FIG. 2 illustrates only the IP sharer 20 as a communication device supporting the NAT function. However, a different communication device such as a router supporting the NAT function may be used alternatively.

The communication network 30 may be one of a LAN, a WAN, a PSTN, a PSDN, an ADSL, an ISDN, etc., using a static IP address or a dynamic IP address.

The remote control management systems 40-1 to 40-m may be connected to a private network or a general communication network 30, like the DVRs 10-1 to 10-n. The remote control management systems 40-1 to 40-m connect to the DVRs 10-1 to 10-n installed at a remote site to perform various control functions such as watching or searching for a stored image, identifying or searching for event occurrence circumstances, etc.

In detail, the remote control management systems 40-1 to 40-m register their own names, network information, product information, etc. When the remote control management systems 40-1 to 40-m connect to the DVRs 10-1 to 10-n, they ask the name service server 50 for network information of the DVRs 10-1 to 10-n, and then connect through the communication network 30 to the corresponding DVR using received network information.

In addition, the remote control management systems 40-1 to 40-m examine at every predetermined time intervals whether network information has changed or not, and when it has changed, send the changed information to the name service server 50.

The name service server 50 is connected between the DVRs 10-1 to 10-n and the remote control management systems 40-1 to 40-m through the communication network. When there is a registration request from the remote control management systems 40-1 to 40-m, the name service server 50 registers received information in a database, manages, searches, stores, deletes, and outputs the information, and may examine, analyze, or gather statistics on network status of the registered DVRs 10-1 to 10-n and remote control management systems 40-1 to 40-m.

In addition, the name service server 50 searches for related information in its own database in response to asking, searching, etc. for a name received from the DVRs 10-1 to 10-n and the remote control management systems 40-1 to 40-m, and sends the search results to the DVRs 10-1 to 10-n or the remote control management systems 40-1 to 40-m.

In FIG. 2, when a user of the DVRs 10-1 to 10-n or the remote control management systems 40-1 to 40-m wants to connect to a communication target, the user connects to the name service server 50 and inputs only a name of the communication connection target. All other processes are performed within the system and thereby the user is connected to the communication target.

When an IP address and port number of the DVRs 10-1 to 10-n and the remote control management systems 40-1 to 40-m change after registration in the name service server 50, the system manages the change internally so that a user need not set up the changed IP address and port number for connection or event report.

FIG. 3 is a table showing an example of a database managed by a name service server of a name service system according to the present invention.

The name service server receives information sent from the DVR or remote control management system, registers it in the form of a database, and stores it in a file in binary format.

In FIG. 3, the column "ID" contains a peculiar key value that the name service server assigns to the DVRs or remote control management systems. Using the peculiar key value, the name service server judges whether a name is valid when it cannot know the user and registers the DVR or remote control management system.

The column "NAME" contains a representative name of the DVRs or remote control management systems. Using the representative name, the DVRs or remote control management systems ask the name service server for network information of the communication connection target.

The columns "IP ADDRESS" and "PORT NUMBER" contain network information of the DVRs or remote control management systems that is used for connection and periodically updated.

The column "NAT" contains an indication of whether the DVRs or remote control management systems use a device supporting the NAT function or not.

The column "Description" stores additional information related to the DVRs or remote control management systems and can be used to store any information as the occasion requires.

Figure 4:
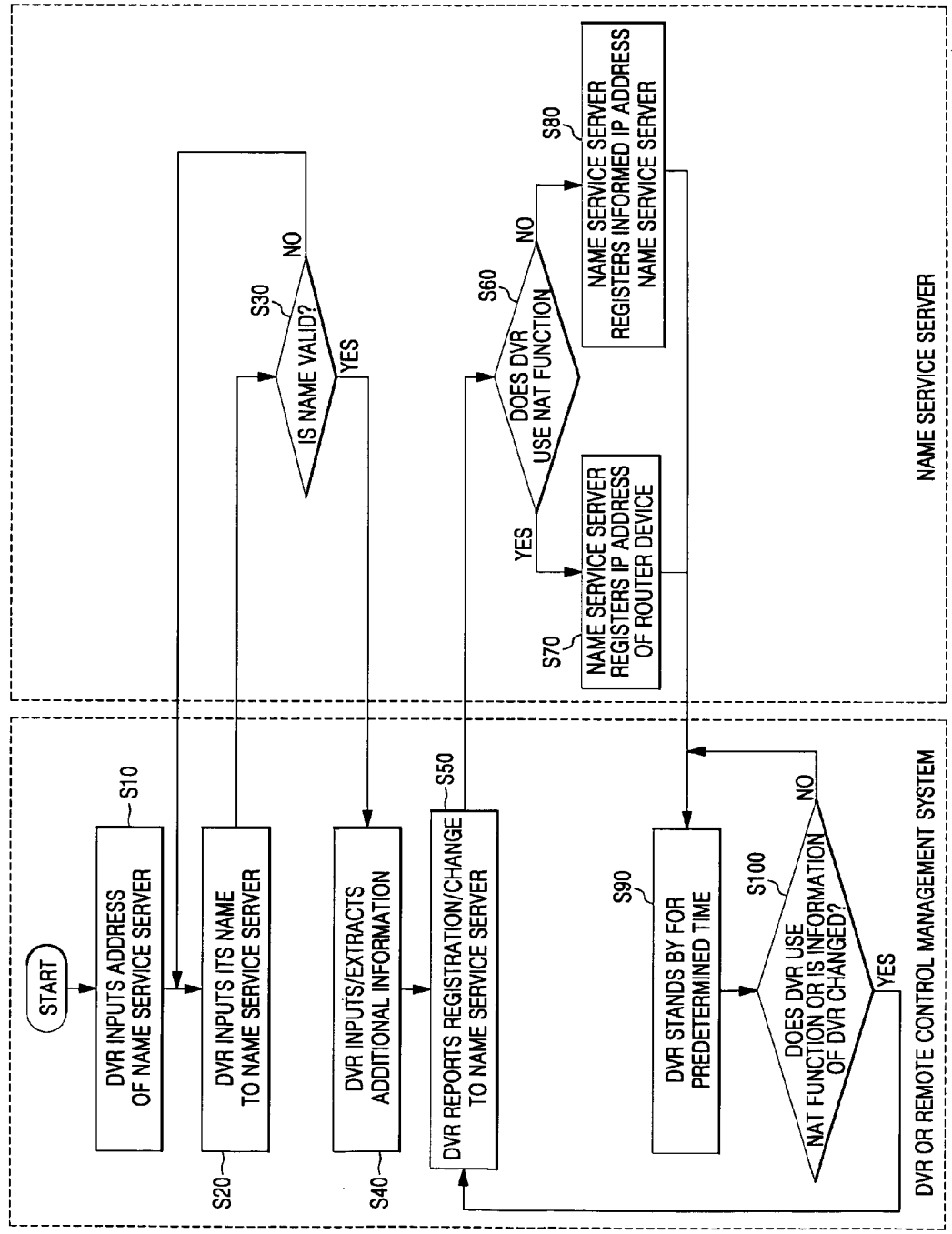
FIG. 4 is a flowchart showing a process in which a DVR or remote control management system registers in a name service server in a name service system of the present invention.

FIG. 4 is a flowchart showing a process in which a DVR or remote control management system registers in a name service server in a name service system of the present invention.

First, the DVRs or remote control management systems wanting to be registered input the address of the name service server (step S10). Here, an IP address or a domain name may be input as the address of the name service server. When the domain name is input, the accurate address of the domain name system server also should be input.

Subsequently, the DVRs or remote control management systems input a name that they want to register (step S20), and then ask the name service server with their own peculiar key value and name if the name is valid. (step S30) The name service server examines whether there is a duplicate name in a registered list excluding the name of the key value asked with, and then informs the DVR or remote control management system of the result. Here, if the name is a duplicate or invalid, the steps S20 and S30 are repeated for another name.

Here, since the name service server is not unique and can be operated by anyone according to an environment and request of the network, when the DVRs or remote control management systems change the name service server to which they are registered, they receive a new key value from the new name service server.

When the name is valid, the DVRs or remote control management systems input or extract additional information such as an IP address, port information, whether the NAT function is used or not, a product code, etc. (step S40), and then request registration in the name service server (step S50).

Subsequently, the name service server judges whether the terminal (DVR or remote control management system) wanting to be registered uses the NAT function (step S60). When the terminal uses the NAT function, the DVR or remote control management system is not connected to the outside directly but rather through a communication device such as an IP sharer or router, and thus it is impossible to access to the terminal from the outside using the terminal's IP information.

In this case, since the communication device supporting the NAT function and the name service server are connected to each other, the name service server registers the IP address of the communication device and registers (step S70). On the other hand, when the terminal does not use the NAT function, the name service server registers the reported IP address (step S80).

When registration is complete, the DVR and remote control management system stand by for a predetermined time (step S90) and then examine whether there is changed information among the information for the name service (step S100). When there is changed information, the DVR and remote control management system inform the name service server of the changed information, and when there is no changed information, steps S90 and S100 are repeated.

The DVR and remote control management system stand by for a predetermined time after their registration is done because when they use a dynamic IP address, they cannot immediately know whether the IP address has changed.

When an IP sharer or router supporting the NAT function is used, the DVR or remote control management system cannot know whether the IP address of the IP sharer or router has changed. Therefore, the DVR or remote control management system periodically requests registration in the name service server at a predetermined time intervals, and examines the IP address of the router device to judge whether it has changed.

Figure 5:
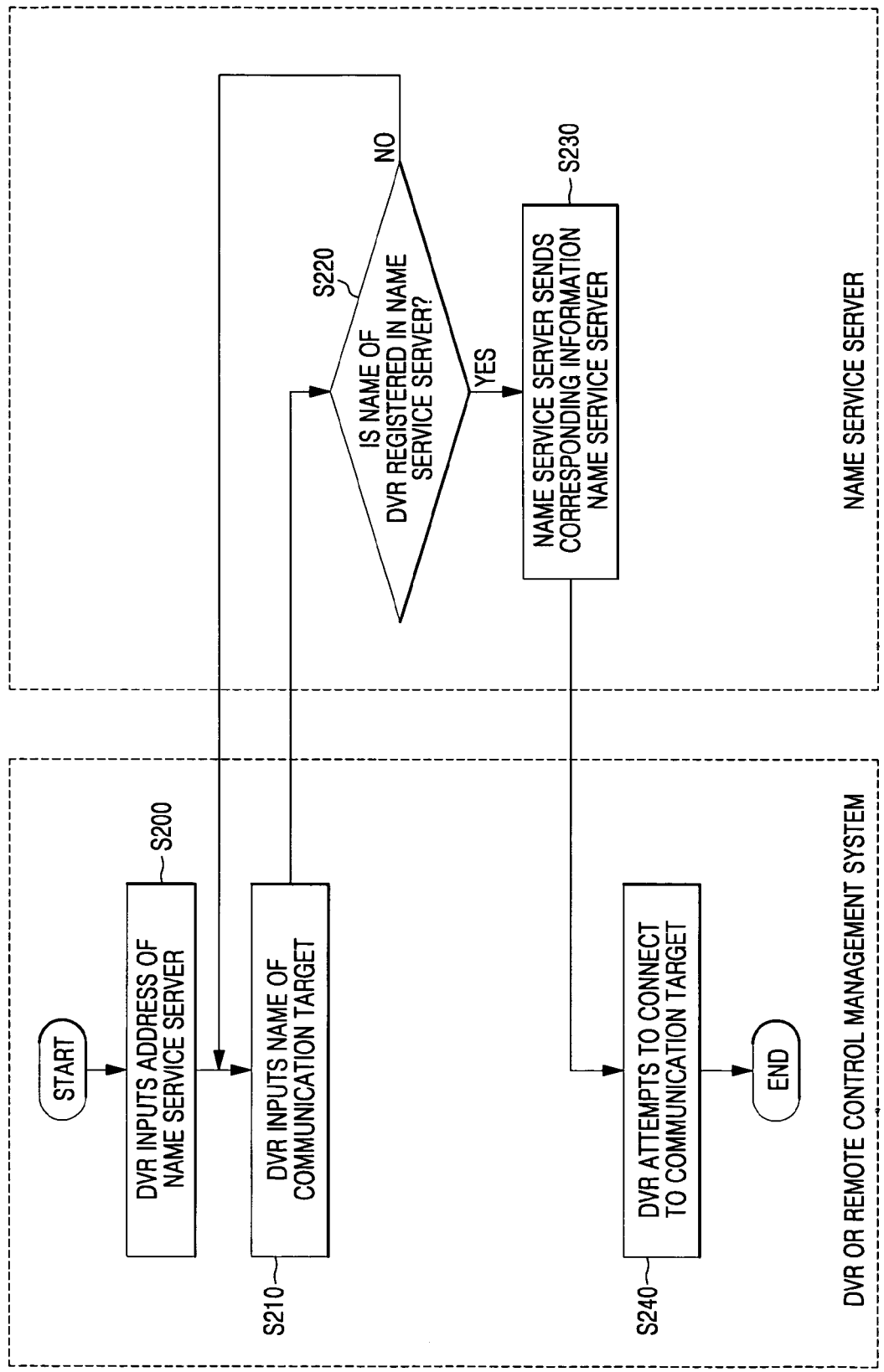
FIG. 5 is a flowchart showing a process in which a DVR or remote control management system makes an enquiry to a name service server in a name service system of the present invention.

FIG. 5 is a flowchart showing a process in which a DVR or remote control management system makes an enquiry of a name service server in a name service system of the present invention.

First, the DVR or remote control management system wanting connection inputs the address of the name service server (step S200). As shown in FIG. 4, the DVR or remote control management system may input an IP address or domain name as the address of the name service server. When the domain name is input, the accurate address of the domain name system server also should be input.

Subsequently, the DVR or remote control management system inputs the name of the communication connection target (step S210). Since registration has already completed, only the name of the communication target is used in this step.

The name service server receiving the enquiry from the DVR or remote control management system searches for the name enquired about in its registered list. When the name is not in the list, the name service server requests re-input of the name (step S220). When the name is in the list, the name service server sends information such as the IP address and port number related to the name to the DVR or remote control management system that made the enquiry (step S230).

The DVR or remote control management system receiving the information sent from the name service server attempts connection using the received network information (step 240).

The name service system operation method described above can be summarized as follows.

First, the DVRs or remote control management systems register their own name and network information in the name service server through the communication network (steps S10 to S100 of FIG. 4). Then, a DVR or remote control management system wanting connection sends the name of the communication target to the name service server through the communication network (steps S200 to S210 of FIG. 5).

The name service server searches its own database for the network information corresponding to the name, and then sends the retrieved network information to the DVR or remote control management system through the communication network (steps S220 to S230 of FIG. 5). Subsequently, the DVR or remote control management system connects to the communication target through the communication network using the received network information (steps S240 of FIG. 5).

Figure 6:
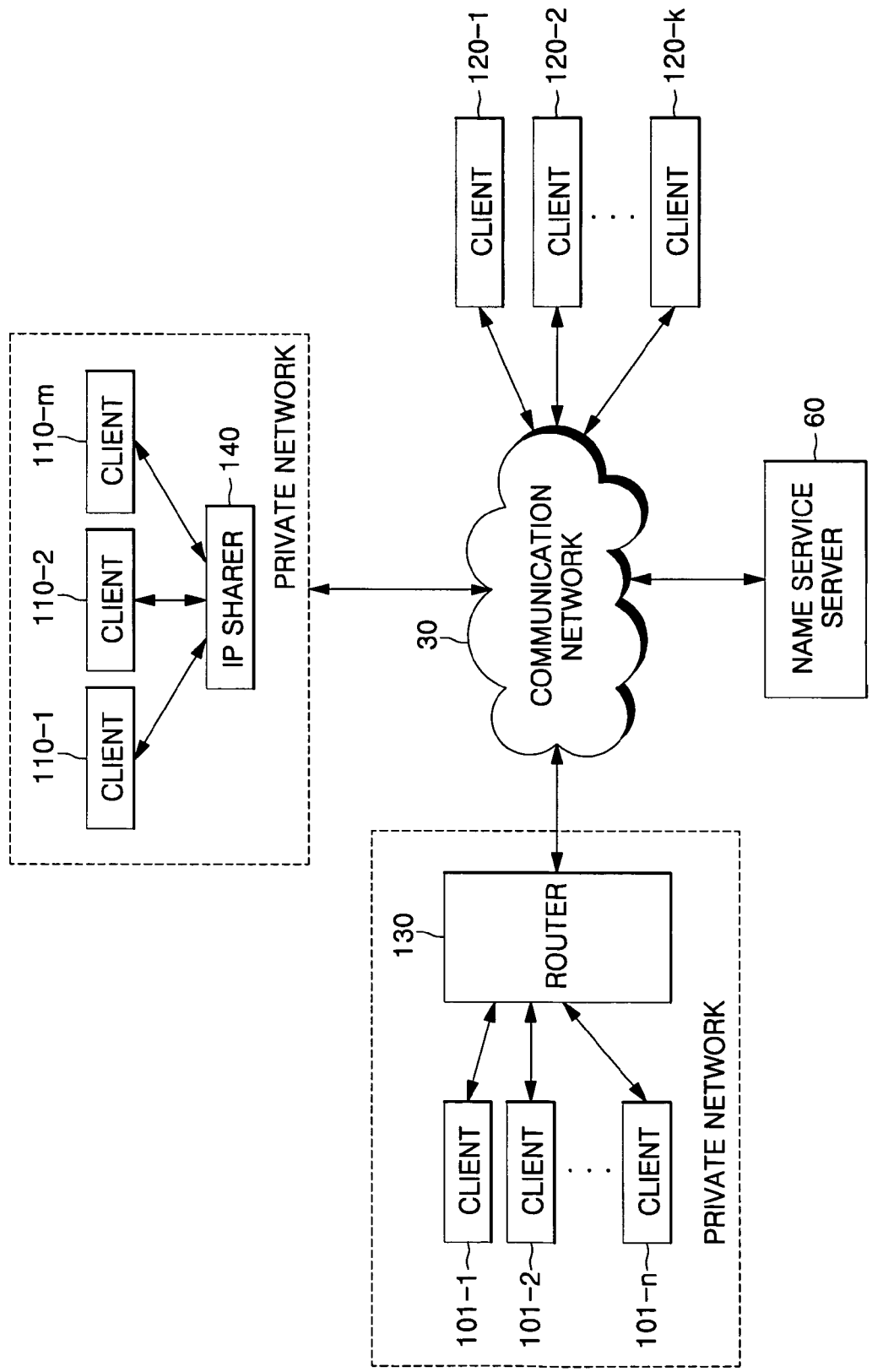
FIG. 6 is a block diagram of a name service system according to another exemplary embodiment of the present invention.

FIG. 6 is a block diagram illustrating another exemplary embodiment of a name service system according to the present invention. The name service system comprises first group clients 101-1 to 101-n and second group clients 110-1 to 110-m using a private IP address, third group clients 120-1 to 120-k using a static IP address, a router 130 connecting the first group clients 101-1 to 101-n to form a private network, an IP sharer 140 connecting the second group clients 110-1 to 110-m to form another private network, a communication network 30 connecting the router 130, the IP sharer 140, and the third group clients 120-1 to 120-k, and a name service server 50 connected to the communication network 30.

In FIG. 6, the clients may be ordinary computers or other kinds of devices that can connect to a communication network.

The first group clients 101-1 to 101-n and the second group clients 110-1 to 110-m, which belong to private networks and use a private IP address and private port number used only in the corresponding private network, send their own name, network information, etc. to the name service server 50 to register themselves.

When the first group clients 101-1 to 101-n or the second group clients 110-1 to 110-m connect to a client belonging to a different group, through the communication network 30, they ask the name service server 50 the name of the client targeted for connection, and then connect through the communication network 30 to the corresponding client using received network information.

The first group clients 101-1 to 101-n and the second group clients 110-1 to 110-m examine whether the network information has changed at every predetermined time intervals, and when it has changed, send the changed information to the name service server 50.

The third group clients 120-1 to 120-k using a static IP address send their own names and network information to register themselves. When the third group clients 120-1 to 120-k connect to another group client, they ask the name service server 50 for network information of the client targeted for connection using the name of the client, and then connect to the client using received information.

The router 130 and the IP sharer 140 support the NAT function. When the clients send information to the communication network 30, the router 130 and the IP sharer 140 convert a private IP address and port number into their own public IP address and port number and send them as the information. When the clients receive the information through the communication network 30, the router 130 and the IP sharer 140 convert the public IP address and port number to the private IP address and port number and send them as the information to the clients.

The communication network 30 has the same constitution and function as the communication network shown in FIG. 2.

When the clients 101-1 to 101-n, 110-1 to 110-m, and 120-1 to 120-k request name registration in the name service server 50, the name service server 50 registers received information in the database. In addition, the name service server 50 manages, searches, stores, deletes, and outputs the information, and may watch, analyze, and gather statistics on the network status of the registered clients 101-1 to 101-n, 110-1 to 110-m, and 120-1 to 120-k.

In addition, the name service server 50 searches its own database for related information in response to enquiries received from the clients 101-1 to 101-n, 110-1 to 110-m and 120-1 to 120-k, and sends the search results to the corresponding client.

In order for a client to connect to another client, the one client connects to the name service server 50 and then inputs the name of the other client. All other processes are performed internally within the system and thereby the two clients are connected.

In addition, after the clients 101-1 to 101-n, 110-1 to 110-m, and 120-1 to 120-k are registered in the name service server, even if their network information changes, the user need not set it up again because it is managed by the system internally.

The name service system and method thereof according to the present invention allow DVRs or remote control management systems that belong to private networks, such as an ADSL or DHCP using a dynamic IP address or the NAT function, to register network information in a name service server and to communicate with a communication target using only the name of the target. This makes it possible to construct a communication network in which connection is easy and effective even when dynamic IP addresses or private IP addresses are used.

The present invention has been described with reference to exemplary embodiments thereof. However, those skilled in the art will appreciate that various modifications can be made to the described exemplary embodiments without departing from the spirit and scope of the present invention defined by the appended claims and their equivalents.

What is claimed is:

1. A name service system comprising:
    a name service server connected to a communication network, the name service server registering a name and corresponding network information received through the communication network when name registration is requested, and sending network information corresponding to the registered name by using only the name without knowing a port information when a name call is requested;
    a plurality of monitoring devices connected to the communication network, the monitoring devices collecting information, having respective names, requesting the name registration to the name service server through the communication network, registering the name and the network information corresponding to the name in the name service server, communicating with the name service server by using only the name without knowing the port information, and sending changed network information to the name service server when the registered network information changes; and
    a plurality of remote control management devices connected to the communication network, the remote control management devices connecting to the name service server through the communication network to request the name call, receiving network information corresponding to the name and sent from the name service server by using only the name without knowing the port information, connecting to the monitoring device through the communication network using the network information, and thus receiving collected information, wherein the network information is an Internet protocol (IP) address and the port information required for connection.

2. The name service system of claim 1, wherein the monitoring devices are a camera obtaining image data for monitoring a remote site, a microphone obtaining voice data, and a digital video recorder (DVR) connected to a plurality of devices including a variety of detection sensors and receiving and storing monitoring data from the devices.

3. The name service system of claim 2, wherein the monitoring devices each request the name call to the name service server through the communication network, receive the network information corresponding to the name and sent from the name service server, and connect to the remote control management device through the communication network using the received network information.

4. The name service system of claim 3, wherein the remote control management devices have respective names, request name registration to the name service server through the communication network and register the name and the network information corresponding to the name in the name service server, and send changed network information to the name service server when the registered network information changes.

5. The name service system of claim 1, wherein
the monitoring devices are connected to a private network using a dynamic IP address and the port information, or a private IP address and the port information, and
the port information is a port number.

6. The name service system of claim 1, wherein
the remote control management devices are connected to a private network using a dynamic IP address and the port information, or a private IP address and the port information, and
the port information is a port number.

7. A name service system comprising:
a name service server connected to a communication network, the name service server registering a name and corresponding network information received through the communication network when name registration is requested, and sending network information corresponding to the registered name by using only the name without knowing a port information when a name call is requested; and
a plurality of first-type clients and second-type clients connected to the communication network, the first-type and second-type clients having respective names, requesting name registration to the name service server through the communication network and registering the name and corresponding network information in the name service server, sending changed network information to the name service server when the registered network information changes, and requesting the name call to the name service server to receive network information corresponding to the name from the name service server by using only the name without knowing the port information,
wherein when any one of the first-type clients and any one of the second-type clients attempt to connect with one another by using only the name without knowing the port information, they do so using the name service server, and
wherein the network information is an IP address and the port information required for connection.

8. The name service system of claim 7, wherein
the first-type clients are connected to a private network using a dynamic IP address and a the port information, or a private IP address and the port information, and connect to the second-type clients through the communication network, and
the port information is a port number.

9. The name service system of claim 7, wherein the second-type clients are connected to a private network using a dynamic IP address and the port information, or a private IP address and the port information, and connect to the first-type clients through the communication network, and the port information is a port number.

10. A method for name service comprising the steps of:
registering name and corresponding network information, at monitoring devices or remote control management devices, in a name service server connected to a communication network;
requesting a name call, at the monitoring devices or remote control management devices, to the name service server by using only the name without knowing a port information through the communication network;
in response to the name call, sending network information, at the name service server, corresponding to the name call by using only the name without knowing the port information through the communication network; and
connecting the monitoring devices or remote control management devices by using the network information through the communication networks,
wherein the network information is an IP address and the port information required for connection.

11. The name service method of claim 10, wherein the step of
registering name in the name service server includes the steps of:
inputting a name to be registered, at the monitoring devices or remote control management devices, in the name service server;
examining whether the name is valid, at the name service server;
inputting or extracting additional information, at the monitoring devices or remote control management devices, to register in the name service server;
judging whether the monitoring devices or remote control management devices use a network address translation (NAT) function, at the name service server, and registering an IP address; and
standing by for a predetermined time, at the monitoring devices and remote control management devices, and then examining whether there is changed information.

12. The name service method of claim 11, wherein in the step of the name service server examining whether the name is valid, the name service server assigns a peculiar key value to each of the monitoring devices and remote control management devices to be registered and thus prevents registration of a duplicate name.

13. The name service method of claim 11, wherein
in the step of the monitoring devices or remote control management devices inputting or extracting additional information to register in the name service server, the monitoring devices and remote control management devices input an IP address and the port information required for bidirectional communication, and
the port information is a port number.

14. The name service method of claim 11, wherein in the step of the name service server judging whether the monitoring devices or remote control management devices use the NAT function and registering the IP address, the name service server registers an IP address of a communication device supporting the NAT function when the monitoring devices or remote control management devices use the NAT function, and registers a received IP address when the monitoring devices or remote control management devices do not use the NAT function.

15. The name service method of claim 11, wherein in the step of the monitoring devices and remote control management devices standing by for a predetermined time and then examining whether there is changed information, the monitoring devices and remote control management devices examine whether there is changed information at every predetermined time intervals and send any changed information to the name service server.

16. The name service method of claim 10, wherein the step of the monitoring devices or remote control management devices requesting a name call to the name service server through the communication network includes the steps of:

inputting an address of the name service server, at the monitoring devices or remote control management devices;

inputting a name of a monitoring device or remote control management device targeted for connection, at the monitoring devices or remote control management devices; and judging whether the called name is registered, at the name service server.

\* \* \* \* \*